United States Patent
Oobayashi

(10) Patent No.: US 7,092,129 B2
(45) Date of Patent: Aug. 15, 2006

(54) INTERNET FACSIMILE AND CONTROL METHOD THEREOF

(75) Inventor: Nobuyuki Oobayashi, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 834 days.

(21) Appl. No.: 09/962,208

(22) Filed: Sep. 26, 2001

(65) Prior Publication Data
US 2002/0075521 A1   Jun. 20, 2002

(30) Foreign Application Priority Data
Dec. 14, 2000 (JP) ............................. 2000-380344

(51) Int. Cl.
H04N 1/00 (2006.01)

(52) U.S. Cl. ................. 358/402; 358/403; 358/405; 358/407

(58) Field of Classification Search ............... 358/402, 358/405, 437, 474, 403, 407
See application file for complete search history.

(56) References Cited

U.S. PATENT DOCUMENTS

| | | | | |
|---|---|---|---|---|
| 5,194,967 A * | 3/1993 | Nonomura | ................. | 358/434 |
| 6,088,125 A * | 7/2000 | Okada et al. | ................ | 358/405 |
| 6,101,244 A * | 8/2000 | Okada | ................... | 379/100.08 |
| 6,496,573 B1 * | 12/2002 | Ichimura | ............... | 379/100.06 |
| 6,545,768 B1 * | 4/2003 | Matsubara et al. | ........ | 358/1.15 |
| 6,700,674 B1 * | 3/2004 | Otsuka et al. | ............. | 358/1.15 |
| 6,825,947 B1 * | 11/2004 | Asai | .......................... | 358/1.18 |
| 6,825,955 B1 * | 11/2004 | Shibata | ....................... | 358/402 |

FOREIGN PATENT DOCUMENTS

| | | | |
|---|---|---|---|
| JP | A-08-23409 | | 1/1996 |
| JP | 11-055486 | * | 2/1999 |
| JP | 11055486 | * | 2/1999 |
| JP | A 11-55486 | | 2/1999 |

* cited by examiner

Primary Examiner—Kimberly Williams
Assistant Examiner—Michael Burleson
(74) Attorney, Agent, or Firm—Oliff & Berridge, PLC

(57) ABSTRACT

In an Internet facsimile 1, scanned and stored image information is broadcasted in facsimile and electronic mail communications according to one transmission instruction of the user.

19 Claims, 6 Drawing Sheets

CONCEPTUAL DRAWING OF NETWORK

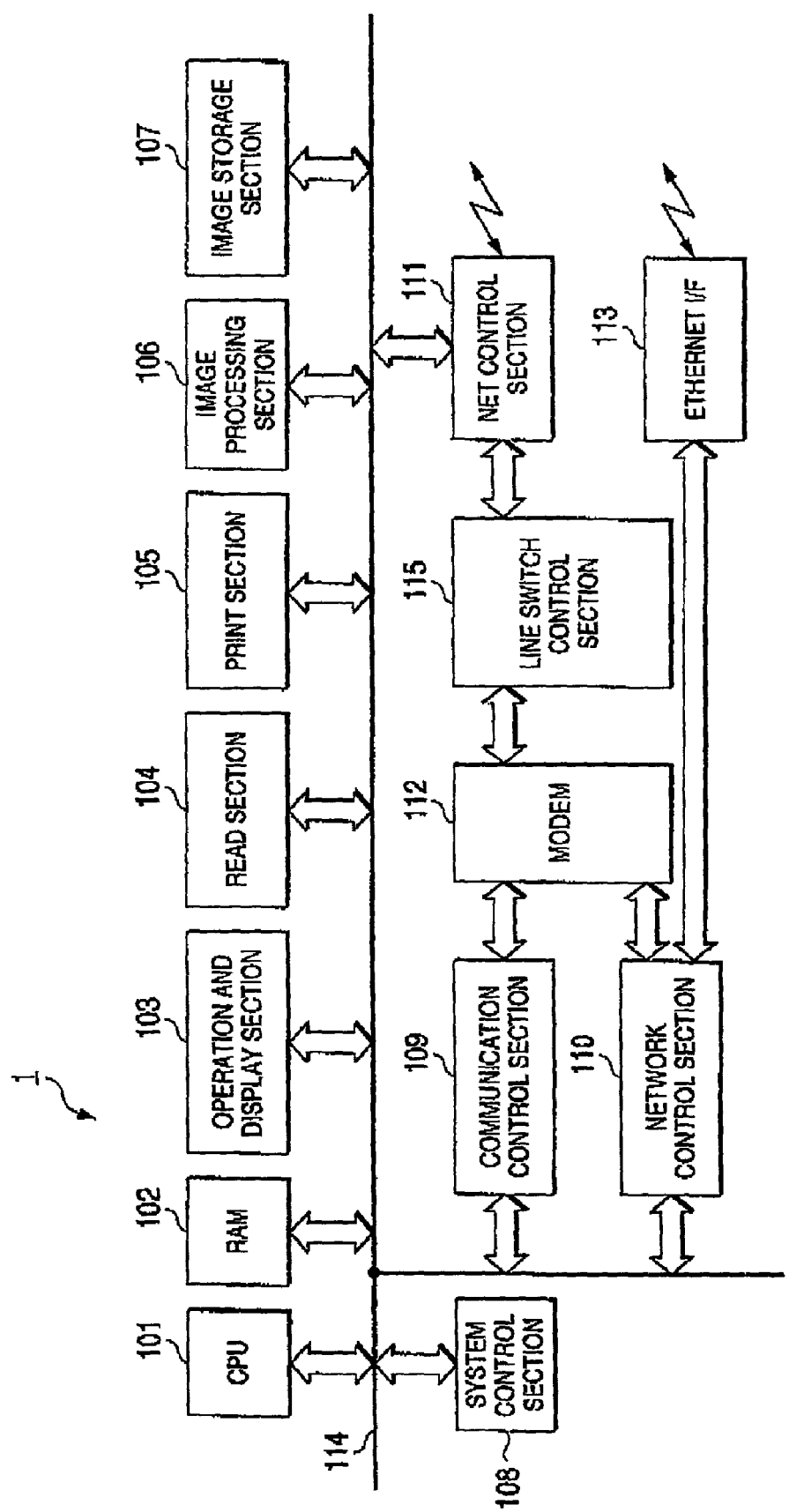

FIG. 3A

TRANSMISSION INSTRUCTION SCREEN (103-1)

DESTINATION A: 03-xxxx-1234
DESTINATION B:
DESTINATION C:
DESTINATION D:
DESTINATION E:
▽ NEXT

START

FIG. 3B

TRANSMISSION INSTRUCTION SCREEN (103-1)

DESTINATION A: 03-xxxx-1234
DESTINATION B: F.Taro@fujixerox.co.jp
DESTINATION C: 03-xxxx-5678
DESTINATION D: F.Hanako@jitaku.ne.jp
DESTINATION E: F.Hanako@fujixerox.co.jp
▽ NEXT

START

FIG. 5

COMMUNICATION RESULT CHECK SCREEN
103-3

| TRANSMISSION JOB NUMBER | COMMUNICATION MEANS | DESTINATION | COMMUNICATION RESULT CONTENTS |
|---|---|---|---|
| NO. 1 | FACSIMILE | 03-xxxx-1234 | "OK" |
| NO. 2 | E-MAIL | F. Taro@fujixerox.co.jp | "SENDING COMPLETED" |
| NO. 3 | E-MAIL | F. Hanako@jitaku.ne.jp | "RETRANSMISSION REQUIRED" |
| ............ | ............ | ............ | ............ |
| NO. n-1 | FACSIMILE | 03-xxxx-5678 | "RETRANSMISSION REQUIRED" |
| NO. n | E-MAIL | F. Hanako@fujixerox.co.jp | "SENDING COMPLETED" |

("OK")
SENDING COMPLETED IS UPDATED TO OK IF IT IS RECOGNIZED THAT NORMAL TRANSMISSION IS COMPLETE BASED ON NOTIFICATION OF MDS/DSN ("RETRANSMISSION REQUIRED")
SENDING COMPLETED IS UPDATED TO RETRANSMISSION REQUIRED IF IT IS RECOGNIZED THAT TRANSMISSION RESULTS IN FAILURE

INTERNET FACSIMILE AND CONTROL METHOD THEREOF

BACKGROUND OF THE INVENTION

1. Field of the Invention

This invention relates to an Internet facsimile and a control method thereof, and in particular those for improving the operability to perform facsimile (FAX) transmission and electronicmail (e-mail) transmission at the same time and making it possible to correctly check the communication result as with facsimile communications also in electronic mail transmission.

2. Description of the Related Art

In an Internet facsimile (iFAX) in the related art, to give a facsimile transmission instruction and an electronic mail transmission instruction, the instructions have to be given separately, In the Internet facsimile (iFAX) in the related art, data communications are conducted directly with the associated party in facsimile (FAX) transmission and thus it is not difficult to check that the transmission is completed; electronic mail (e-mail) transmission is executed via a server, etc. Thus if the transfer operation to the server is normally completed, it is not easy to check whether or not the electronic mail has been sent to the correct destination to which the electronic mail should be sent.

Thus, in e-mail transmission, the check result as to whether or not e-mail has been transmitted to the associated party is unknown upon completion of the transmission operation from the facsimile, and a report different in meaning of the communication result of good transmission is output in FAX and e-mail.

In the Internet facsimile in the related art, to give a facsimile transmission instruction and an electronic mail transmission instruction, the instructions rust be given separately as described above; the operation is time-consuming operation for the user.

In the Internet facsimile (iFAX) in the related art, in e-mail transmission, the check result as to whether or not e-mail has been transmitted to the associated party is unknown upon completion of the transmission operation from the facsimile, and a report different in meaning of the communication result of good transmission is output in FAX and e-mail, and thus the user cannot correctly check the communication result of e-mail transmission.

SUMMARY OF THE INVENTION

It is therefore an object of the invention to provide an Internet facsimile and its control method for improving the operability to perform facsimile (FAX) transmission and electronicmail (e-mail) transmission at the same time and making it possible to correctly check the communication result as with facsimile communications also in electronic mail transmission.

To the end, according to the invention, there is provided an Internet facsimile capable of sending scanned and stored image information as facsimile or electronic mail communications, the Internet facsimile comprising a broadcast control section for broadcasting the scanned and stored image information in facsimile and electronic mail communications according to one transmission instruction.

According to the invention, the Internet facsimile further comprises an output section for outputting the communication result of broadcast of the broadcast control section as a communication result report.

According to the invention, the output section outputs the communication result report when transmission operation to all destinations is complete.

According to the invention, the output section outputs the communication result report when a predetermined time has elapsed since completion of transmission operation to all destinations.

According to the invention, the output section outputs the communication result report when notification indicating whether or not the image information is correctly transmitted to all destinations to which transmission operation is performed is received.

According to the invention, the output section outputs the communication result report at a different timing in response to the destination to which the broadcast instruction is applied.

According to the invention, the Internet facsimile further comprises a setting section for selectively setting the communication result report output timing of the output section as desired.

According to the invention, the communication result of broadcast of the broadcast control section is registered when transmission is complete, and the Internet facsimile further comprises an update section for updating the communication result if the communication result is later changed because of any other factor.

According to the invention, there is provided a control method of an Internet facsimile capable of sending scanned and stored image information as facsimile or electronic mail communications, the control method comprising the steps of broadcasting the scanned and stored image information in facsimile and electronic mail communications according to one transmission instruction and outputting the communication result of broadcast as a communication result report.

According to the invention, the communication result report is output when transmission operation to all destinations is complete.

According to the invention, the communication result report is output when a predetermined time has elapsed since completion of transmission operation to all destinations.

According to the invention, the communication result report is output when notification indicating whether or not the image information is correctly transmitted to all destinations to which transmission operation is performed is received.

According to the invention, the communication result report is output at a different timing in response to the destination to which the broadcast instruction is applied.

According to the invention, the communication result report output timing is selectively set as desired.

According to the invention, the communication result of broadcast is registered when transmission is complete, and if the communication result is later changed because of any other factor, the communication result is updated.

BRIEF DESCRIPTION OF THE DRAWINGS

FIG. 2 is a block diagram to show the system configuration of the Internet facsimile of the invention shown in FIG. 1.

FIGS. 3A and 3B are drawings to show one configuration example of a transmission instruction screen displayed on an operation and display section of the Internet facsimile shown in FIG. 2.

FIG. 5 is a drawing to show one configuration example of a communication result check screen displayed on the operation and display section of the Internet facsimile shown in FIG. 2.

DETAILED DESCRIPTION OF THE PRESENT INVENTION

Figure 1:
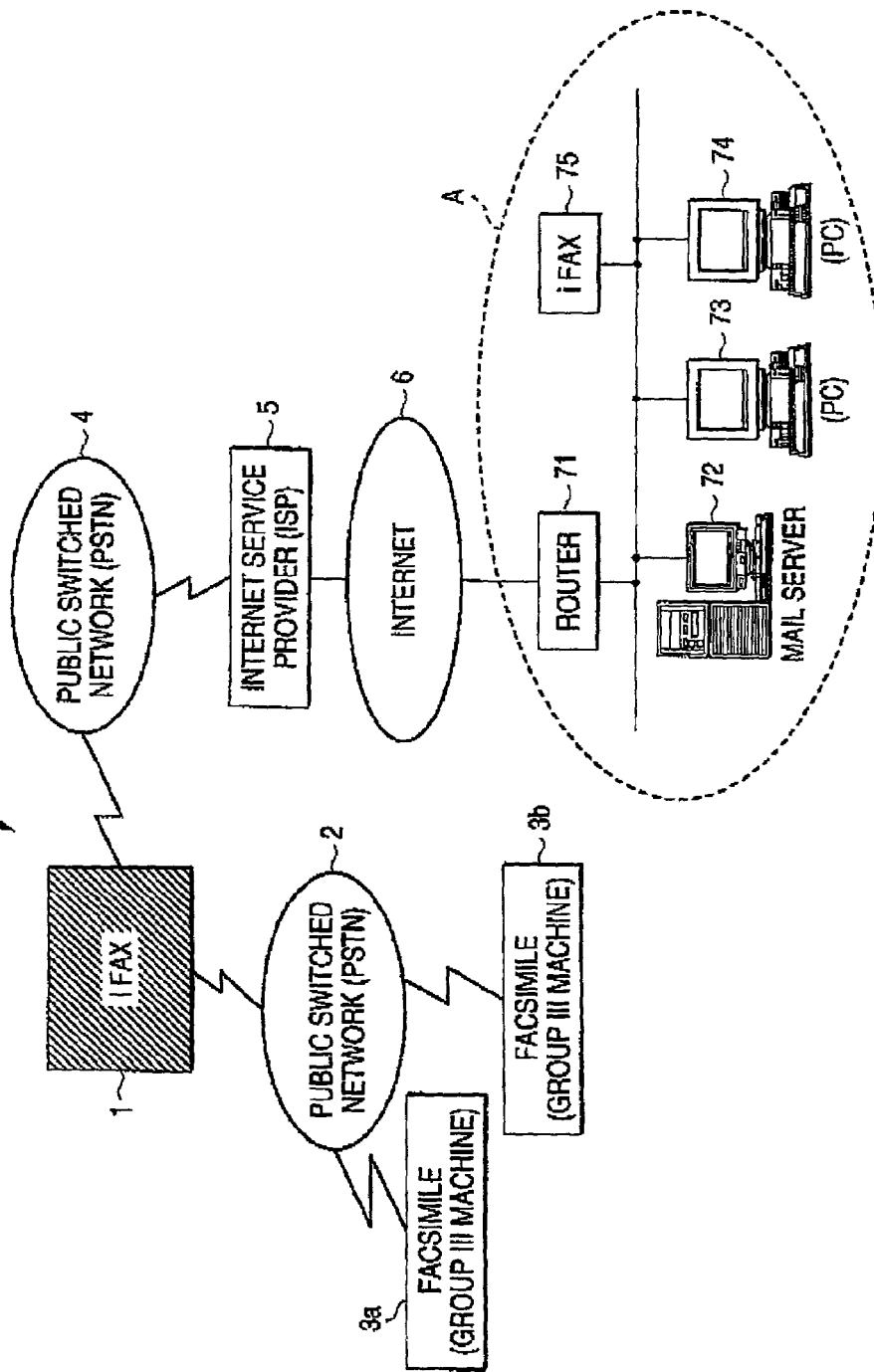
FIG. 1 is a conceptual drawing to show one configuration example of a network incorporating an Internet facsimile of the invention.

Referring now to the accompanying drawings, there is shown an embodiment of the invention, FIG. 1 is a conceptual drawing to show one configuration example of a network incorporating an Internet facsimile (iFAX) 1 of the invention.

As shown in FIG. 1, in the conceptual drawing of the network, the Internet facsimile (iFAX) 1 is connected via a public switched network (PSTN) 2 to facsimiles such as Group III facsimiles (simply, FAX) and is also connected via a public switched network (PSTN) 4, an Internet service provider (ISP) 5, Internet 6, and a router 71 of a network A to another iFAX 75 and personal computers (simply, PC) 73 and 74.

The Internet facsimile (iFAX) 1 is a machine capable of transmitting and receiving FAX data formerly transmitted and received on a telephone line using an IP network such as the Internet or an intranet as some or all transmission lines or capable of transmitting and receiving FAX on the IP network.

FIG. 2 is a block diagram to show the system configuration of the Internet facsimile (iFAX) 1 of the invention shown in FIG. 1.

As shown in FIG 2, the Internet facsimile (iFAX) 1 comprises a CPU 101, RAM 102, an operation and display section 103, a read section 104, a print section 105, an image processing section 106, an image storage section 107, a system control section 108, a communication control section 109, a network control section 110, a net control section 111, and a line switch control section 115 which are connected by a system bus 14, and further comprises a modem 112 and an Ethernet I/F 113 for receiving from a facsimile.

The CPU 101 performs control processing of the whole Internet facsimile (iFAX) 1. The RAM 102 is memory used to control the Internet facsimile (iFAX) 1. The operation and display section 103 is provided for operating the Internet facsimile (iFAX) 1. The read section 104 reads a transmitted original. The image processing section 106 is a section for performing processing of coding, decoding, scaling up, scaling down,etc. The image storage section 107 is a section for storing image information. The system control section 108 is a program for controlling the whole Internet facsimile and is implemented as ROM, etc., for example. The communication control section 109 controls communications fitted to a telephone network The network control section 110 controls communications connected to network. The net control section 111 is provided for connecting to net. The modem 112, which is a modulator-demodulator, comprises low-speed and high-speed mode functions. The Ethernet I/F113 is an interface for connecting to Ethernet. The system bus 114 is a bus for transferring data from one component to another. The line switch control section 115 is provided for connecting a plurality of external line interfaces and a plurality of internal communication circuits.

The components, the CPU 101 to the net control section 111, mutually transfer data via the system bus 114.

To execute normal Scan to e-mail transmission, storage and transmission parameters are entered through the operation and display section 103 and image information is read through the read section 104 based on the entered parameters. The read image information is stored in the image storage section 107 and then is processed with the RAM 102 as a buffer using the image processing section 106 as required under the control of the system control section 108 for converting the image in the image storage section 108 into a format suitable for transmission; finally the image is sent through the modem 112, the net control section 111, and the communication control section 109 to the telephone network by facsimile or is transmitted from the network control section 110 via the Ethernet I/F 113 by e-mail.

FIGS. 3A and 3B are drawings to show one configuration example of a transmission instruction screen 103-1 displayed on the operation and display section 103 of the Internet facsimile (iFAX) 1 previously described with reference to FIG. 2.

FIG. 3A shows an example of the setup state for transmitting to one destination; in this example, "03-****-1234" is entered and set in the input field of destination A.

FIG. 3B shows an example of the setup state for transmitting to more than one destination; in this example, "03-**-1234" is entered and set in the input field of destination A, "F.Taro@fujixerox.co.jp" is entered and set in the input field of destination B, "03-**-5678" is entered and set in the input field of destination C, "F.Hanako@jitaku.ne.jp" is entered and set in the input field of destination D, and "F.Hanako@fujixerox.co.jp" is entered and set in the input field of destination E.

The Internet facsimile (iFAX) 1 of the invention enables the user to give a transmission instruction of both facsimile (FAX) communications and electronic mail (e-mail) communications using the transmission instruction screen 103-1; the user enters telephone number information if the transmission destination is FAX and mail address information if e-mail is transmitted and gives a transmission instruction.

If more than one associated party to which information, etc., is to be transmitted exists and different types of communications such as FAX and e-mail are mixed, different types of destination information, namely, telephone number information and mail address information can be entered at the same time and a transmission instruction can be given at a time.

Figure 4:
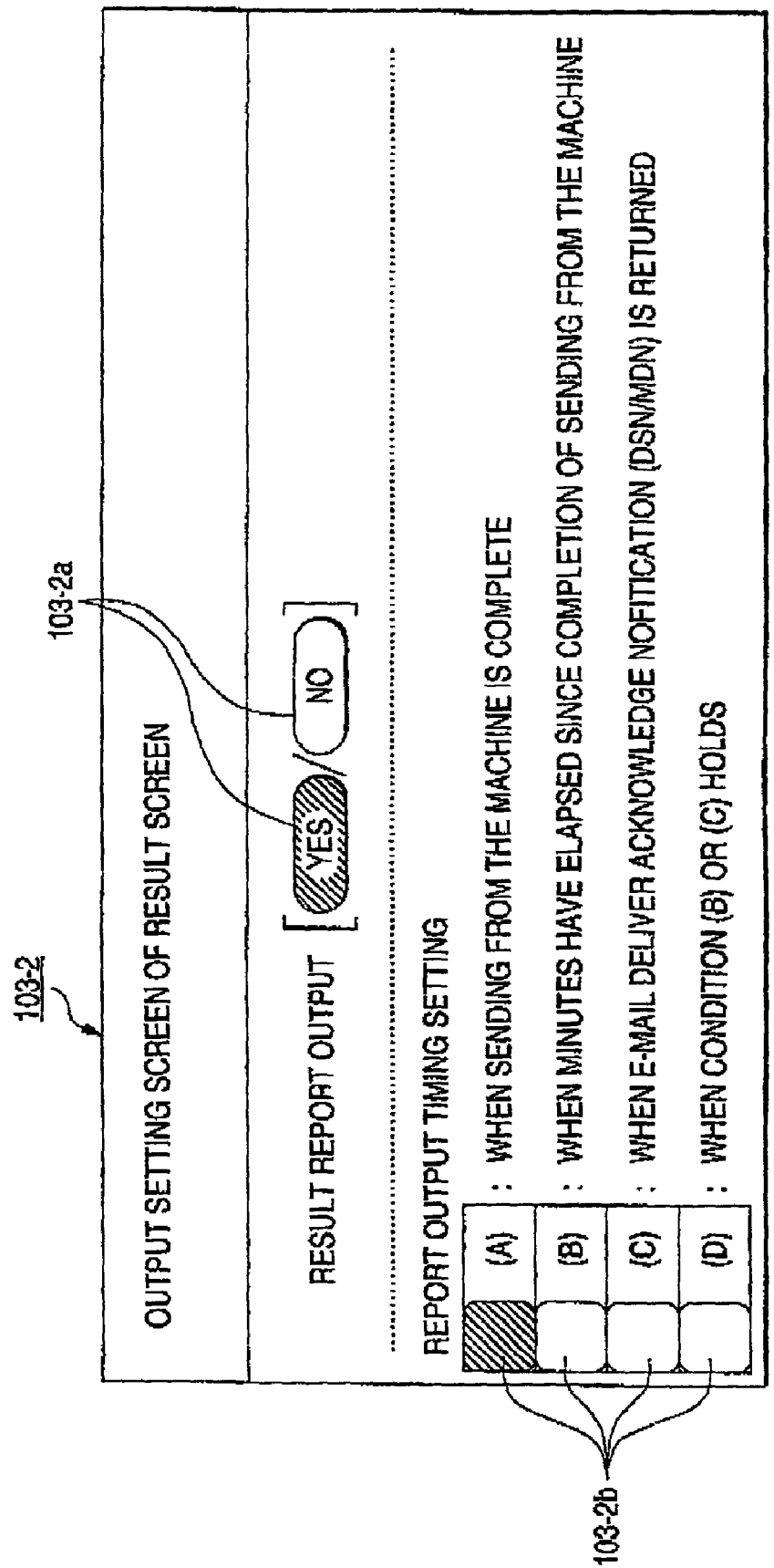
FIG. 4 is a drawing to show one configuration example of a result report output setting screen displayed on the operation and display section of the Internet facsimile shown in FIG. 2.

FIG. 4 is a drawing to show one configuration example of a result report output setting screen 103-2 displayed on the operation and display section 103 of the Internet facsimile (iFAX) 1 previously described with reference to FIG. 2.

As shown in FIG. 4, the result report output setting screen 103-2 comprises button icons 103-2a to specify whether or not a result report is to be output and button icons 103-2b to set the report output timing if a result report is output.

The result report output timings are as follows: (A) when sending from the machine is complete, (B) when N minutes have elapsed since completion of sending from the machine, (C) when e-mail delivery acknowledge notification (DSN (Delivery Status Notifications) /MDN (Message Disposition Notifications) is returned, and (D) when condition (B) or (C) holds. Hereinafter, the term "result report output" or "outputting a result report" means creating a result report based on the results of each transmission at that time and outputting the created result report.

The user can use the result report output setting screen 103-2 to specify whether or not the result report is to be output when performing the transmission operation. At this time, if the user does not specify output of the result report (YES), whether or not the result report is output is determined based on setting of the facsimile. The user can also use the result report output setting screen 103-2 to set the result report output timing.

The example shows the state in which the user selects and presses YES of the button icon 103-2a to output the result report and the state in which the user selects and presses (A) of the button icon 103-2b among the result report output timings.

FIG. 5 is a drawing to show one configuration example of a communication result check screen displayed on the operation and display section 103 of the Internet facsimile (iFAX) 1 previously described with reference to FIG. 2.

As shown in FIG. 5, the communication result check screen 103-3 displays "transmission job No." item information, "communication means" item information, "destination" item information, and "communication result contents" item information as display item information. The contents of each item are displayed in association with the transmission job No.

The contents indicating the number of the transmission job are displayed under the transmission job No., the contents indicating the communication mode (facsimile or e-mail communications) are displayed under the communication means, the contents indicating the destination information of the transmission destination are displayed under the destination, and the contents indicating the communication result of each transmission job are displayed under the communication result contents.

The example shows that "FAX" is displayed as the communication means item information, "03-**-1234" as the destination item information, and "OK" as the communication result contents item information under transmission job No. 1, that "E-Mail" is displayed as the communication means item information, "F.Taro@fujixerox.co.jp" as the destination item information, and "sending completed" as the communication result contents item information under transmission job No. 2, that "E-Mail" is displayed as the communication means item information, "F.Hanako@jitaku.ne.jp" as the destination item information, and "retransmission required" as the communication result contents item information under transmission job No. 3, . . . , that "FAX" is displayed as the communication means item information, "03-**-5678" as the destination item information, and "retransmission required" as the communication result contents item information under transmission job No. n-1, and that "E-Mail" is displayed as the communication means item information, "F.Hanako@fujixerox.co.jp" as the destination item information, and "sending completed" as the communication result contents item information under transmission job No. n.

Thus, with the Internet facsimile (iFAX) 1 of the invention, in FAX transmission, "OK" or "retransmission required" is registered as the communication result contents when the transmission operation is complete, and the registration contents are displayed on the operation and display section 103 in response to a user's instruction for informing the user.

In e-mail transmission, "sending completed" or "retransmission required" is registered as the communication result contents when the transmission operation to the server is complete, and the registration contents are displayed on the operation and display section 103 for informing the user. In e-mail transmission, if it can be recognized that normal transmission is complete based on the delivery acknowledge notification of MDS/DSN, "sending completed" of the communication result contents is updated to "OK" and if it can be recognized that the transmission results in failure, "sending completed" of the communication result contents is updated to "retransmission required."

Such a configuration enables the user to correctly check on the display screen the communication result of a transmission instruction in which different types of communications such as facsimile (FAX) and electronic mail (e-mail) communications are mixed, The report of printing the communication result output as a hardcopy and the communication result check information displayed on the operation and display section in the embodiment correspond to the communication result report in WHAT IS CLAIMED IS.

Figure 6:
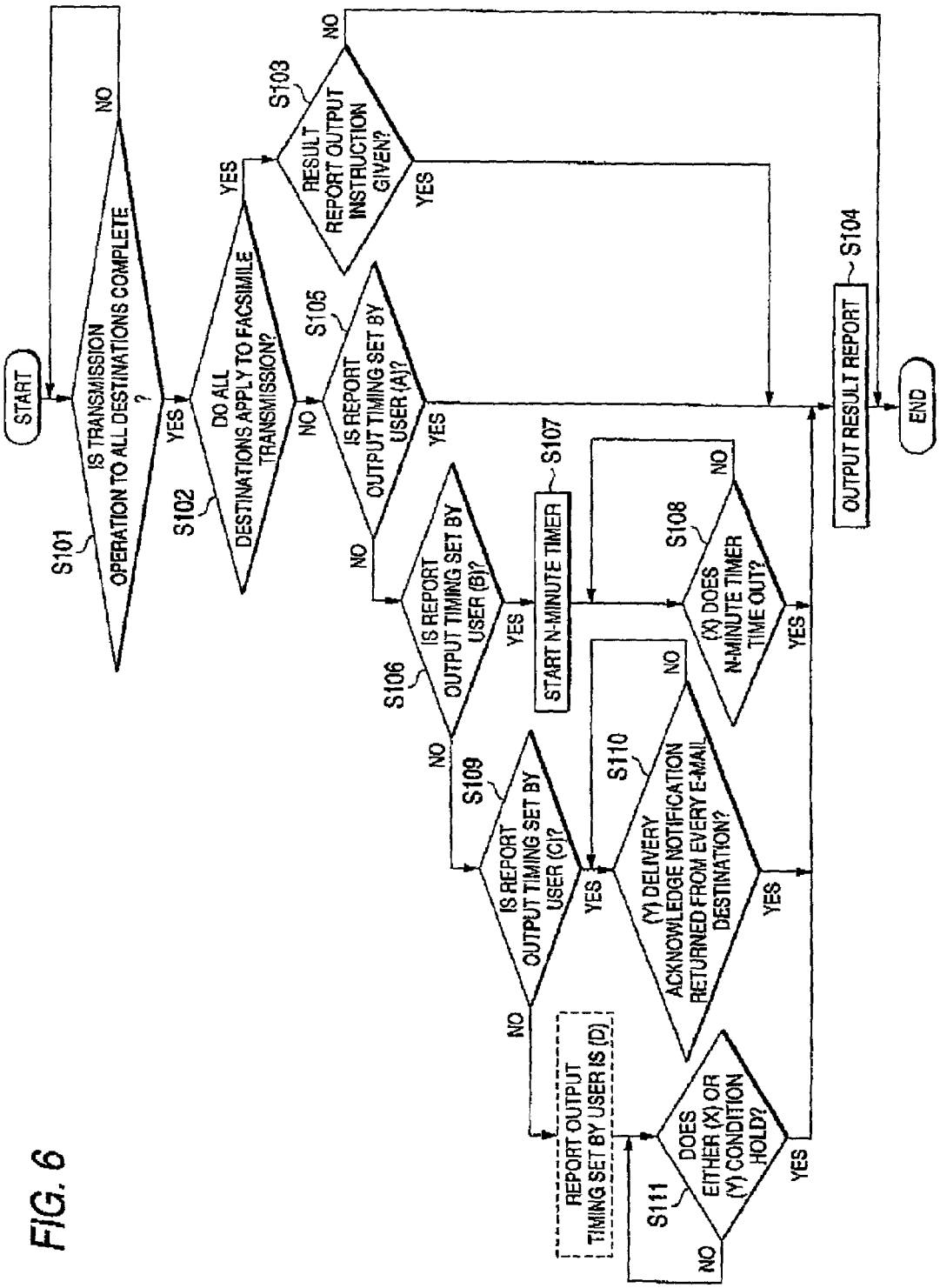
FIG. 6 is a flowchart to show a processing procedure of result report output control in the Internet facsimile of the invention shown in FIG. 2.

FIG. 6 is a flowchart to show a processing procedure of result report output control in the Internet facsimile (iFAX) 1 of the invention previously described with reference to FIG. 2. It shows the processing procedure of result report output control in the Internet facsimile when the user uses the transmission instruction screen 103-1 previously described with reference to FIG. 2 to specify a plurality of transmission destinations and give a transmission instruction.

As shown in FIG. 6, in the processing, in the Internet facsimile (iFAX) 1, first whether or not the transmission operation to all destinations based on one transmission instruction of the user is complete is determined (step S101). If it is determined that the transmission operation to all destinations is complete (step S101 YES), the processing is started.

Next, whether all destinations apply to FAX transmission is determined (step S102).

If it is determined that all destinations apply to FAX transmission (step S102 YES), then whether or not the user gives an instruction to output a result report on the result report output setting screen 103-2 previously described with reference to FIG. 4 is determined (step S103).

If it is determined that an instruction to output a result report is given (step S103 YES), then a result report is output (step S104) and the processing is terminated.

On the other hand, if it is determined that the user does not give an instruction to output a result report (step S103 NO), the processing is terminated.

If it is not determined that all destinations apply to FAX transmission (step S102 NO), then the report output timing set by the user is checked. For example, first whether or not the report output timing set by the user is (A) is determined (step S105).

If it is determined that the report output timing set by the user is (A)(step S105 YES), then control goes to step S104 and immediately a result report is output. After the result report output is complete, the processing is terminated.

On the other hand, if it is not determined that the report output timing set by the user is (A) (step S105 NO), then whether or not the report output timing set by the user is (B) is determined (step S106).

If it is determined that the report output timing set by the user is (B) (step S106 YES), then a preset N (N- Any integer)-minute titer is started (step 107) and if it is determined that the N-minute timer times out (step S108 YES), control goes to step S104 and a result report is output. After the result report output is complete, the processing is terminated.

If it is not determined that the report output timing set by the user is (B) (step S106 NO), then whether or not the report output timing set by the user is (C) is determined (step If it is determined that the report output timing set by the user is (C) (step S109 YES), then whether or not a delivery acknowledge signal (DSN/MDN) is returned from every e-mail destination is determined (step S110).

If it is determined that a delivery acknowledge signal (DSN/MDN) is returned from every e-mail destination (step S110 YES), control goes to step S104 and a result report is output. After the result report output is completer the processing is terminated.

On the other hand, if it is not determined that the report output timing set by the user is (C) (step S109 NO), that is, if the report output timing set by the user is (D), then whether or not either condition holds in determination similar to (X): "Determination as to whether or not N-minute timers times out" described above at step S108 and (Y): "Determination as to whether or not a delivery acknowledge notification is returned from every e-mail destination" described above at step S110 is determined (step S111). If it is determined that either (X) or (Y) condition holds (step S111 YES), control goes to step S104 and a result report is output. After the result report output is complete, the processing is terminated.

Such a configuration enables, the user to correctly check the communication result of a transmission instruction in which different types of communications such as facsimile (FAX) and electronic mail (e-mail) communications are mixed as a communication result report.

According to each configuration described above, in e-mail transmission, a check can be made to ensure that transmission to the associated party can be accomplished correctly before the result information is updated or output, so that it is made possible to notify the user of communication result information equivalent to that of FAX transmission.

It is also made possible to select the optimum communication result report output timing as desired depending on whether the transmission destination is FAX or e-mail for outputting a communication result report.

As described above, the Internet facsimile of the invention makes it possible to broadcast scanned and stored image information in facsimile and electronic mail communications according to one transmission instruction.

According to the invention, it is also made possible to display the communication result of broadcast on a display screen or output the communication result as a communication result report for informing the user of the communication result.

According to the invention, it is made possible to select the output timing of the communication result report as desired for outputting the communication result report.

What is claimed is:

1. An Internet facsimile comprising:
   a scanner that scans an image;
   a storage section that stores the image scanned;
   a facsimile transmitter that transmits the image as facsimile information to a destination telephone number;
   an e-mail transmitter that transmits the image as e-mail information to a destination e-mail address;
   a broadcast control section that controls the facsimile transmitter to transmit the image to the destination telephone number and the e-mail transmitter to transmit the image to the destination e-mail address according to one transmission instruction;
   an output section that outputs a communication result of the broadcast control section as a communication result report; and
   a setting section that selectively sets an output timing of the communication result report from the output section.

2. The Internet facsimile as claimed in claim 1, wherein the communication result of the broadcast control section is registered when transmission is complete.

3. The Internet facsimile as claimed in claim 2, further comprising an update section for updating the communication result when the communication result is changed after the registration.

4. The Internet facsimile according to claim 1, wherein the setting section allows a user to select the output timing of a communication result report concerning transmission to the destination e-mail address, from the group comprising:
   (a) timing at which notification indicating completion of correct transmission of the image are received from the destination e-mail address,
   (b) timing at which transmission operation to all destination e-mail addresses is complete, and
   (c) timing at which a predetermined time has elapsed since completion of transmission operation to all destination e-mail addresses.

5. The Internet facsimile according to claim 4, wherein the output section outputs a communication result report concerning transmission to the destination telephone number when transmission operation to the destination telephone number is complete.

6. The Internet facsimile according to claim 1, wherein the setting section allows a user to select the output timing of a communication result report concerning transmission to the destination e-mail address.

7. A method of controlling an Internet facsimile comprising:
   scanning an image;
   storing the image scanned;
   transmitting the image as facsimile information to a destination telephone number and e-mail information to a destination e-mail address at a substantially same time according to one transmission instruction; and
   outputting a communication result of the facsimile information and the e-mail information as a communication result report;
   wherein an output timing of the communication result report is selectively set.

8. The control method as claimed in claim 7, wherein the communication result report is output at a different timing depending on the destination.

9. The control method as claimed in claim 7, further comprising:
   registering the communication result of the broadcast when the transmissions are complete.

10. The control method as claimed in claim 7, further comprising:
    updating the communication result if the communication result is later changed.

11. An Internet facsimile comprising:
    a scanner that scans an image;
    a storage section that stores the image scanned;
    a facsimile transmitter that transmits the image as facsimile information to a destination telephone number;
    an e-mail transmitter that transmits the image as e-mail information to a destination e-mail address;

a broadcast control section that controls the facsimile transmitter to transmit the image to the destination telephone number and the e-mail transmitter to transmit the image to the destination e-mail address according to one transmission instruction; and an output section that outputs a communication result of the broadcast control section as a communication result report, wherein:

the output section outputs the communication result report at a different timing depending on the destinations.

12. The Internet facsimile as claimed in claim 11, wherein the output section outputs the communication result report when transmission operation to all destinations is complete.

13. The Internet facsimile as claimed in claim 11 wherein the output section outputs the communication result report when a predetermined time has elapsed since completion of transmission operation to all destinations e-mail address.

14. The Internet facsimile according to claim 11, wherein the output section outputs a communication result report concerning transmission to the destination e-mail address and a communication result report concerning transmission to the destination telephone number at different timings.

15. The Internet facsimile according to claim 11, wherein the output section outputs a communication result report concerning transmission to the destination telephone number when transmission operation to the destination telephone number is complete.

16. The Internet facsimile according to claim 11, wherein the output section outputs the communication result report concerning transmission to destination e-mail addresses when transmission operation to all the destination e-mail addresses is complete.

17. The Internet facsimile according to claim 11, wherein the communication result of the broadcast control section is registered when transmission is complete.

18. The Internet facsimile according to claim 17, further comprising an update section that updates the communication result when the communication result is changed after the registration.

19. The Internet facsimile according to claim 11, wherein the output section outputs a communication result report concerning transmission to the destination e-mail address, when a notification indicating completion of correct transmission of the image are received from the destination e-mail address.

* * * * *